Sept. 23, 1969      F. R. WOODWARD      3,468,071

SIDE EDGE TRIMMING OF WELDED STRIP

Filed March 14, 1966      2 Sheets-Sheet 1

INVENTOR.
FOSTER R. WOODWARD
BY
Francis J. Klempay
ATTORNEY

INVENTOR.
FOSTER R. WOODWARD
BY
*Francis G. Klempay*
ATTORNEY

United States Patent Office 3,468,071
Patented Sept. 23, 1969

3,468,071
SIDE EDGE TRIMMING OF WELDED STRIP
Foster R. Woodward, Warren, Ohio, assignor to The Taylor-Winfield Corporation, Warren, Ohio, a corporation of Ohio
Filed Mar. 14, 1966, Ser. No. 534,173
Int. Cl. B24b 9/04, 21/06
U.S. Cl. 51—110                                         5 Claims

ABSTRACT OF THE DISCLOSURE

Apparatus for removing side edge burrs from metal strip advancing longitudinally in its own plane. Carriers are provided on opposite sides of the strip and on which are mounted abrasive means driven at high speed, such as an abrasive belt entrained about closely spaced rollers. The flat reaches of the abrasive belts are splayed outwardly at a small angle to the edges of the strip opposite to the direction of movement thereof and are canted relative to the plane of the strip. Thus the strip can vary in width. Rotating discs of abrasive material may be substituted for the abrasive belts.

---

This invention relates to the side edge preparation of welded strip, and more particularly to improved method and apparatus for removing the burrs or "thumb nails" which are integrally formed along the side edges of strip when the same is welded into indeterminate length by joining discrete lengths thereof in a general end-to-end relation by transverse welds, whether of the flash-butt, overlap seam or arc-welding process. The extrusions from the flat surfaces of the strip as results from the flash-butt process particularly and possibly from the arc welding process is generally removed by a cross-cut trimming operation, and heretofore the side burrs have been removed by die cutting or by drawing the strip between relatively fixed planar-type of tools to scarf off the burrs. Die-cutting either requires the moving welded strip to be stopped or a complicated structure of flying press, either of which is disadvantageous for obvious reasons. Planer-type of scarfing tools are not satisfactory due to multilation of the strip edges, particularly when the welded joint is between the strip lengths of different widths or if the strip lengths are not accurately aligned.

It is accordingly the primary object of the present invention to provide improved method and apparatus for effectively and quickly removing the side edge burrs of welded strip while the strip is moving longitudinally and without regard to misalignment of the composite strip lengths or variation in the width of the lengths.

The above object is accomplished, in accordance with the invention, by employing belt or wheel-type of abrasive cutters which are automatically indexed into proper contact with the opposite side edge surfaces of the strip and which are operative to rapidly grind down the burrs or "thumb nails" as the strip is drawn between a pair of the indexed abrasive devices. The abrasive belts or wheels are so mounted on the indexing carriers that they have flat reaches which are splayed outwardly in the direction which is reverse to the direction of travel of the stock between the pair of belts to thereby facilitate the progressive entry of the stock into the grinding throat of the apparatus without danger of bending or mutilating the side edges of the stock.

The driven abrasive belt units are further canted in a vertical direction—i.e. about horizontal axes with respect to the horizontal path of travel of the stock—to present major or at least substantial portions of the widths of the belts to the metal surfaces to be ground to thereby prolong the life of the belts by eliminating the tendency of the wear to be concentrated in narrow zones of the belts.

The above and other objects and advantages of the invention will become apparent upon consideration of the following specification and the accompanying drawing wherein there is disclosed a preferred embodiment of the invention.

Figure 1:
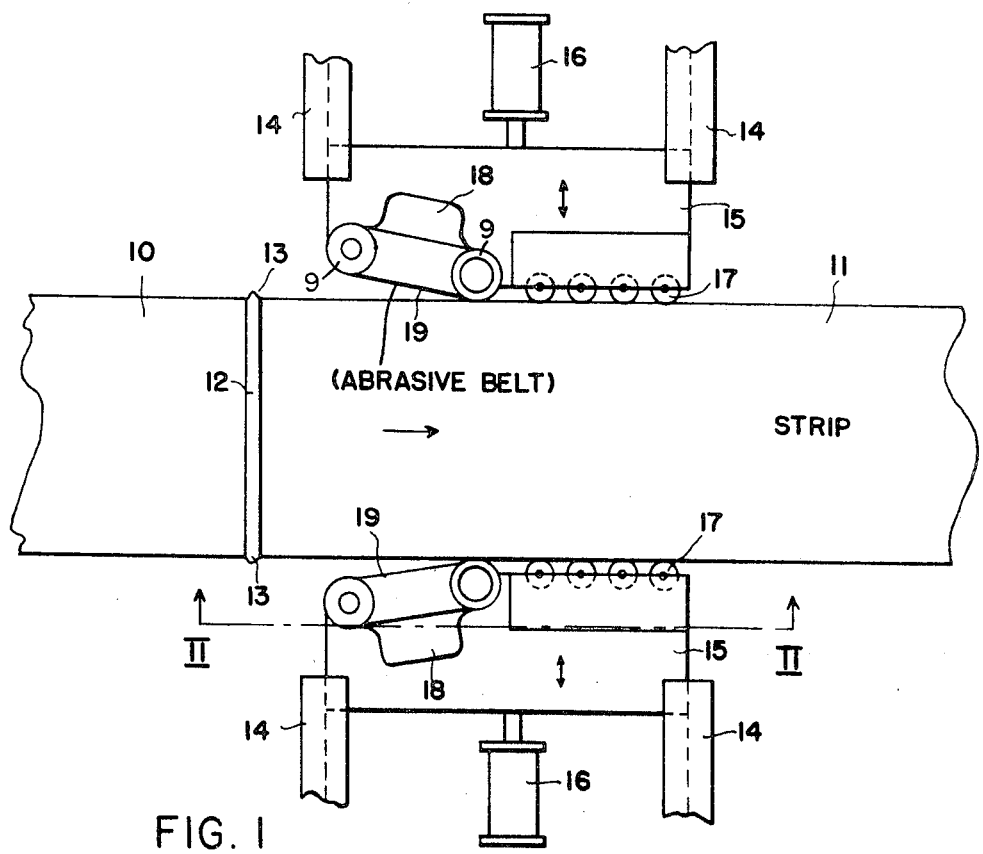
FIGURE 1 is a schematic plan view of apparatus for carrying out the principles of the invention.

In the drawing, reference numeral 10 designates a strip length the head end of which has been joined to the tail end of a preceding strip length 11 by a welding process. In the joining of the lengths beads 12 of flash or upset have been thrown up on opposite flat surfaces of the strip, and their removal may be accomplished by a cross-cut trimmer which is well known in the art and which does not form any part of the present invention. In the joining process, however, burrs or "thumb nails" 13 may be formed along the side edges of the strip in general continuation of the beads 12, and it is the purpose of the present invention to provide an improved method and means for removing these burrs.

Positioned on either side of the path of travel of the strip 10, 11 is a track or guide 14 in which is slideably mounted a carrier 15 for movement toward and away from the strip. These carriers are arranged to be so actuated by double-acting cylinders 16 preferably operated by air under controlled pressure. Rotatably mounted on the carriers 15 are the vertically disposed rollers 17 which are adapted to have contacting engagement with the side edges of the strip under light pressure actuation of the cylinders 16 whereby the carriers 15 may be retained in proper indexed positions with respect to the side edges of the strip.

Also mounted on the carriers 15 are the motor-driven abrasive-belt grinders 18 which have abrasive belts 19 adapted to be brought into grinding relation with the side edges of the strip. These units 18, 19, may be either electrically or air-powered and are commonly available in the open market for heavy-duty industrial uses. The belts 19 are commonly cloth-backed and surfaced with a highly efficient abrasive, such as granulose aluminum oxide. As shown, the belts are entrained over a pair of spaced wide rollers or pulleys 9, at least one of which is motor-driven whereby the belt moves at a high surface speed. Such mounting of the belts presents rapidly moving flat surfaces to the side edges of the strip as will be readily understood.

As shown more particularly in FIGURE 1, the units 18, and 19 are so mounted on the carriers 15 that the above referenced flat surfaces are splayed outwardly from the side edges of the strip in the direction opposite to the direction of travel of the strip through the apparatus. This is advantageous not only in progressively reducing the burrs 13 but also to assist the units in climbing over increased widths of the stock as is necessary when the lengths 10 and 11 are misaligned or when the length 10 is wider than the length 11. This climbing over is possible, of course, by the yielding retraction of the piston, not shown, in the cylinder 16 against the action of the low control air pressure which tends to bias the carrier 15 inwardly.

Figure 2:
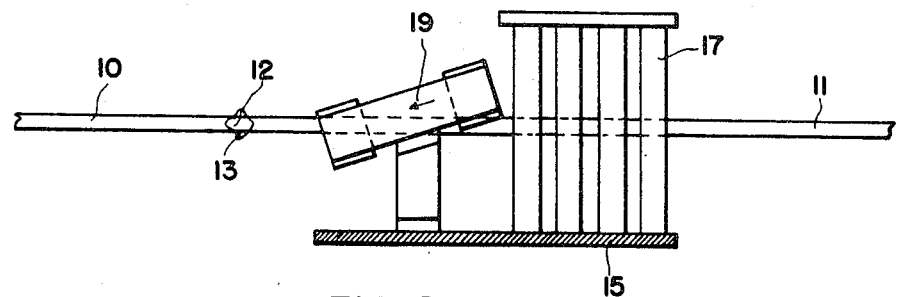
FIGURE 2 is a vertical section taken along the line II—II of FIGURE 1.

As shown in FIGURE 2, the abrasive-cutting units 18, 19 are further so positioned on the carriers 15 that the belts move in a downwardly inclined relation to the side edges of the strip. This is advantageous for the following two reasons: First, the arrangement insures that all or substantially all of the surfaces of the belts engage the work so that localized wear is minimized and there is no tendency for circumferential grooves to wear in the belts. In this connection it should be understood that the angularity of the belts with respect to the side edges of the strip as shown in FIGURE 1 is exaggerated for illustrative purposes, it being obvious that the forward belt-entraining rollers need be spaced from the side edges of the strip only sufficient to clear the burrs 13 for the outward extension of one or the other of the side edges of the strip length 10 in case of misalignment or variation in width of this length with respect to the length 10 as above mentioned. Secondly, since the principal components of contact of the interengagement of the belts with the side edges of the strip are in a direction longitudinal of the strip there is little tendency of bending down or otherwise mutilating the side edges since concentration of pressure is lessened.

Figure 3:
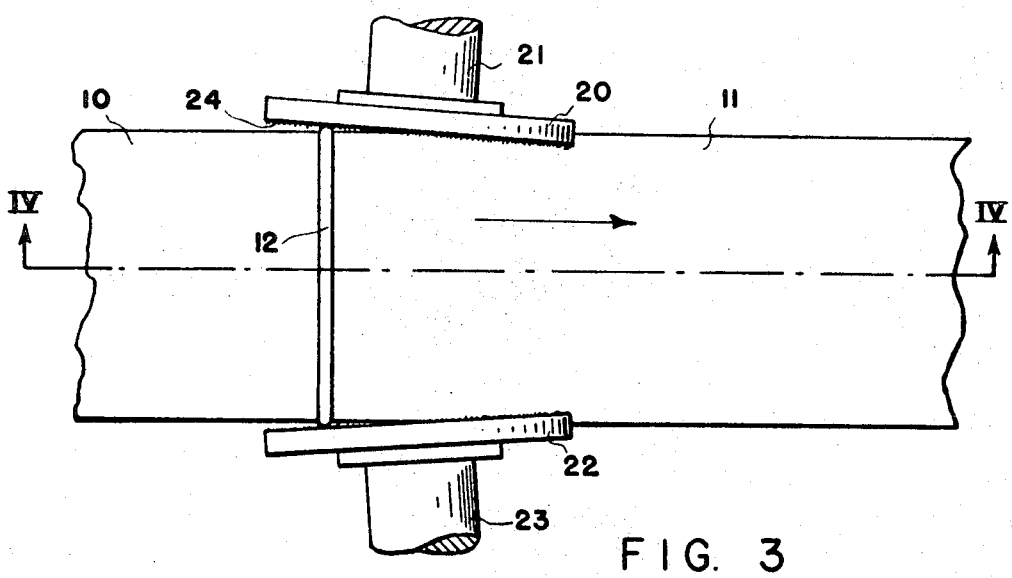
FIGURE 3 is a schematic plan view of a further embodiment of the invention using flat disk-type of abrasive wheels to remove the burrs or "thumb nails"
Figure 4:
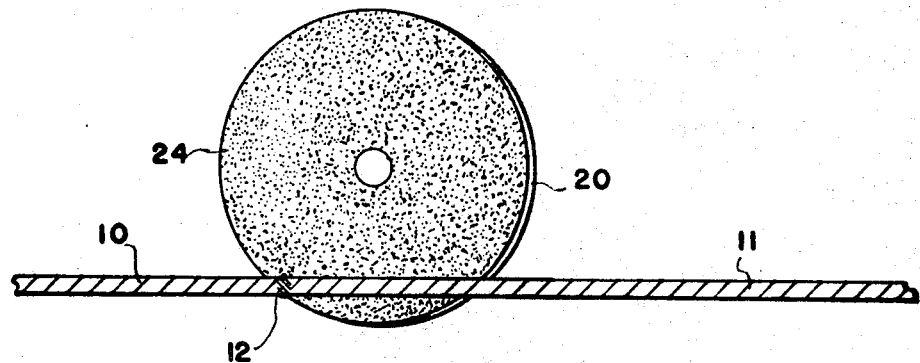
FIGURE 4 is a vertical sectional view taken along the line IV—IV of FIGURE 3.

In the embodiment of the invention shown in FIGURES 3 and 4 the rapidly moving abrading surface is in the form of a coating 24 on the inner faces of the discs 20 and 22 which, in turn, are rigidly mounted on the inner ends of shafts 21 and 23, respectively. In actual practice, the shafts 21 and 23 are suitably driven at high speed and are suitably journaled in anti-friction bearings, not shown, which are adjustably mounted on a suitable base whereby the angularity of the shafts and the vertical spacing from the plane of the strip 10, 11 may be readily adjusted, as desired. Also, suitable yielding means such as springs, not shown, will be employed to yieldingly press the discs 20 and 22 into light pressure contact with the side edges of the strip and/or suitable stops, also not shown, to limit the inward movement of the discs so as to avoid any marking or mutilation of the principal reaches of the side edges of the strip while yet effectively removing the projecting lateral burrs from the weld zone 12. It should be obvious that the general operation and results achieved by the embodiment of FIGURES 3 and 4 is like that of the embodiment of FIGURES 1 and 2.

It should now be apparent that I have provided an improved method and apparatus for removing the burrs or "thumb nails" from the side edges of welded strip which accomplishes the object initially set out above. The apparatus required is exceedingly simple and inexpensive and may be mounted anywhere along the path of travel of the strip regradless of whether or not there exists strip centering devices in the vicinity of the apparatus. So long as sufficient yieldable forces are applied to hold the abrasive belts or abrasive discs into efficient grinding contact with the side edges of the strip the apparatus will operate to adequately knock off the burrs regardless of the instantaneous lateral positions of the abrasive belts or discs with respect to fixed mountings such as the guides 14. Also, as explained above, inaccuracies in the transverse alignment of the succeeding strip lengths will have no deleterious effect, and this is also true of any condition wherein one or the other of the strip lengths 10, 11 is of a width different than the width of the adjacent length.

In either of the embodiments of the invention the abrading means is presented in flat reaches or planes which, in actual practice, are only slightly angled with respect to the side edges of the strip. This effects a "spread out" line of contact so that the burrs or "thumb nails" may be cleanly removed without burning or otherwise mutilating the strip even though the strip is moving at a fairly rapid speed in a processing or utilization line.

Having thus decribed my invention what I claim is:

1. Apparatus for removing side edge burrs from metal strip advancing longitudinally in its own plane, comprising a carrier slidably disposed on one side of the strip so as to move in a direction transversely of the strip, means mounted on said carrier providing a rapidly moving, relatively small, flat abrasive surface for engaging the side edge of said strip, said flat abrasive surface being splayed outwardly at a slight angle to the side edge of the strip in the direction opposite to the longitudinal direction of movement of the strip.

2. Apparatus for removing side edge burrs from metal strip advancing longitudinally in its own plane, comprising guide means extending transversely of the strip along both sides thereof, a carrier slidably mounted on each of said guide means, power means for transversely moving said carriers toward and away from the side edges of said strip, means mounted on each carrier for driving abrasive means rapidly along a relatively small flat plane which is splayed outwardly at a slight angle to the side edges of the strip opposite to the longitudinal direction of movement of said strip.

3. Apparatus as recited in claim 2 wherein said last mentioned means comprises a pair of closely spaced, rollers which extend substantially at right angles to the plane of the strip and which are driven by motor means supported on said carrier, a rotatable belt having an outer coating of abrasive material and being entrained about said pair of rollers so that the flat belt portion closest to the side edge of the strip is splayed outwardly in a direction opposite to the direction of movement of said strip, said belts being canted so that said flat portions thereof, which face said side edges, have inclined movement with respect to the longitudinal plane of the strip.

4. Apparatus as recited in claim 2 wherein said abrasive means comprises a pair of flat discs, one on each side edge of the strip, each disc being covered on its inner surface with a layer of abrading material.

5. Apparatus as recited in claim 3 together with vertically disposed, anti-friction rollers mounted on each carrier in spaced parallel relationship for riding the side edge of the strip for continuously locating said carriers relative to the side edges of the strip.

References Cited

UNITED STATES PATENTS

| | | | |
|---|---|---|---|
| 1,933,640 | 11/1933 | Schafer | 51—80 X |
| 2,194,757 | 3/1940 | Klaas | 51—112 X |
| 2,417,737 | 3/1947 | Culp | 51—111 |
| 2,601,749 | 7/1952 | Johnson | 51—140 |
| 2,762,173 | 9/1956 | Böttcher | 51—138 X |
| 2,779,141 | 1/1957 | Speno | 51—165.03 X |
| 3,090,170 | 5/1963 | Slattery | 51—140 |

ROBERT C. RIORDON, Primary Examiner

D. G. KELLY, Assistant Examiner

U.S. Cl. X.R.

51—112, 137, 140